United States Patent
Zhang et al.

(10) Patent No.: US 11,305,595 B2
(45) Date of Patent: Apr. 19, 2022

(54) APPARATUS AND METHOD FOR MANAGING LIFE CYCLE OF TYRE

(71) Applicant: HAMATON AUTOMOTIVE TECHNOLOGY CO., LTD., Zhejiang (CN)

(72) Inventors: Jianer Zhang, Zhejiang (CN); Zhiyong Jie, Zhejiang (CN)

(73) Assignee: HAMATON AUTOMOTIVE TECHNOLOGY CO., LTD

( * ) Notice: Subject to any disclaimer, the term of this patent is extended or adjusted under 35 U.S.C. 154(b) by 629 days.

(21) Appl. No.: 16/321,700

(22) PCT Filed: Sep. 21, 2016

(86) PCT No.: PCT/CN2016/099633
§ 371 (c)(1),
(2) Date: Jan. 29, 2019

(87) PCT Pub. No.: WO2018/018733
PCT Pub. Date: Feb. 1, 2018

(65) Prior Publication Data
US 2021/0283960 A1     Sep. 16, 2021

(30) Foreign Application Priority Data

Jul. 29, 2016  (CN) .......................... 201610621875.2

(51) Int. Cl.
*B60C 23/04*     (2006.01)
(52) U.S. Cl.
CPC ...... *B60C 23/0488* (2013.01); *B60C 23/0447* (2013.01)
(58) Field of Classification Search
CPC . B60C 23/0488; B60C 23/0447; B60C 19/00; B60C 23/0408; B60C 23/20; G01M 17/02
(Continued)

(56) References Cited

U.S. PATENT DOCUMENTS 9,050,862 B2 *  6/2015  Mouchet ............. B60C 23/0479
9,376,118 B2 *  6/2016  Benedict ................. B60C 23/00
(Continued)

FOREIGN PATENT DOCUMENTS

BR    PI0603458 A    3/2008
CN    103112321 A    5/2013
(Continued)

OTHER PUBLICATIONS

International Search Report and Written Opinion; dated May 4, 2017 for PCT Application No. PCT/CN2016/099633.

*Primary Examiner* — Eric Blount
(74) *Attorney, Agent, or Firm* — Mendelsohn Dunleavy, P.C.

(57) ABSTRACT

An apparatus and method for managing the life cycle of a tyre. The apparatus includes a tyre state detector (100) and a data processor (200), wherein the tyre state detector (100) is configured to detect and send a first identity identifier of the tyre state detector (100) and state detection parameters to the data processor (200); and the data processor (200) is configured to obtain a second identity identifier and usage scenario information of the tyre, generate and send tyre life cycle management information corresponding to the tyre. By obtaining the second identity identifier and the usage scenario information of the tyre, and establishing a correspondence relation so as to generate and send the tyre life cycle management information corresponding to the tyre, the life cycle management of the tyre can be achieved, and thus the intelligent management of the tyre is achieved.

9 Claims, 2 Drawing Sheets

(58) Field of Classification Search
USPC .................................................. 340/442–447
See application file for complete search history.

(56) References Cited

U.S. PATENT DOCUMENTS

| | | | |
|---|---|---|---|
| 9,428,013 B2* | 8/2016 | Singh | B60C 11/246 |
| 10,245,905 B2* | 4/2019 | Sudou | G07C 5/008 |
| 2002/0130771 A1* | 9/2002 | Osborne | B60C 23/0401 |
| | | | 340/438 |
| 2005/0087593 A1 | 4/2005 | Benedict | |
| 2007/0182531 A1* | 8/2007 | Kuchler | B60C 23/04 |
| | | | 340/438 |
| 2011/0166825 A1* | 7/2011 | Kammann | B60C 23/0408 |
| | | | 702/165 |
| 2011/0304449 A1* | 12/2011 | Lickfelt | B60C 23/0452 |
| | | | 340/442 |
| 2014/0067193 A1* | 3/2014 | Gokyu | B60C 99/006 |
| | | | 701/31.9 |
| 2014/0107946 A1* | 4/2014 | Kandler | B60C 11/246 |
| | | | 702/34 |
| 2016/0167446 A1* | 6/2016 | Xu | B60C 23/0479 |
| | | | 702/34 |
| 2016/0263950 A1* | 9/2016 | Colantoni | B60C 23/0401 |
| 2017/0129498 A1* | 5/2017 | Singh | G01M 17/02 |

FOREIGN PATENT DOCUMENTS

| | | |
|---|---|---|
| CN | 105150775 A | 12/2015 |
| JP | 2006021660 A | 1/2006 |

* cited by examiner

APPARATUS AND METHOD FOR MANAGING LIFE CYCLE OF TYRE

CROSS-REFERENCE

The present application is a 371 continuation of PCT Application No. PCT/CN2016/099633, filed Sep. 21, 2016, which in turn claims priority to Chinese Patent Application No. 2016106218752, filed on Jul. 29, 2016, entitled "Apparatus and Method for Managing Life Cycle of Tyre", the disclosures of which are incorporated herein by reference in its entirety.

FIELD OF TECHNOLOGY

The present disclosure relates to the technical field of tyre safety intelligentization, and particularly to an apparatus and method for managing life cycle of tyre.

BACKGROUND

As the main carrier of the vehicle, tyre is also the most important wearing part of the vehicle. According to statistics, tyre cost accounts for about 5% of the vehicle transportation cost. More importantly, tyres are also related to the safety and energy conservation of a vehicle, therefore the life cycle management and intelligent management of tyre are very important.

The basis for the life cycle management and intelligent management of tyre is that each tyre has an independent identity code. The traditional tyre life cycle management mainly uses bar code, two-dimensional code, RFID (Radio Frequency Identification) chip code. However, since the bar code and the two-dimensional code are usually arranged on the surface of the tyre, they are easily worn in the use of the tyre, resulting in that they cannot be recognized in a later stage, so that an entire tyre life cycle management cannot be accomplished. An RFID chip is a smart identification tag that can be integrated with the tyre during the entire process from tyre production to tyre scrapping, thereby enabling the management of the tyre life cycle. However, since the RFID chip lacks power source, has simple functions and a small storage capacity, the low-frequency RFID chip relies on the energy of the tool to stimulate the scanning and reading when reading the chip information that can be read only by finding the exact location and reading very closely. In some cases, it has to reach to the inside of tyre to read the chip information. While high-frequency and ultra-high frequency RFID chips also have no power source and rely on tools to stimulate reading, although the distance can be read is far, multiple tyres may be stimulated to cause misreading, therefore the reading is difficult. In practical work, although the tyre manufacturers can use two-dimensional code, bar code, RFID chip, etc., manual reading device are mostly used, therefore it is impossible to achieve real life cycle management and intellectualization of tyre.

The tyre pressure monitoring system is a tyre safety intelligent technology widely used in recent years, but it is currently only used to monitor the tyre pressure and the tyre temperature, with such a single function which cannot meet the needs of users. Therefore, one of the existing technical problems to be solved is how to achieve the life cycle management of the tyre, thereby achieving the intelligent management of the tyre.

SUMMARY

In view of the defects that, the prior art lacks a solution capable of achieving the life cycle management and the intelligent management of tyre, the present disclosure provides an apparatus for managing life cycle of tyre. The apparatus includes a tyre state detector and a data processor;

wherein, the tyre state detector is configured to detect state detection parameters of a tyre, and send a first identity identifier of the tyre state detector and the state detection parameters to the data processor;

the data processor is configured to obtain a second identity identifier of the tyre and usage scenario information of the tyre input by a user, and establish a correspondence relation according to the first identity identifier, the state detection parameters, the second identity identifier, the usage scenario information and present date, so as to generate and send tyre life cycle management information corresponding to the tyre.

Alternatively, the data processor includes a low frequency exciter configured to send a low frequency excitation signal to the tyre state detector;

the tyre state detector further includes a first receiver configured to receive the low frequency excitation signal;

correspondingly, the tyre state detector is specifically configured to detect the state detection parameters of the tyre after receiving the low frequency excitation signal sent by the data processor.

Alternatively, the tyre state detector is specifically configured to detect the state detection parameters of the tyre after detecting a rotation of a wheel corresponding to the tyre.

Alternatively, the tyre state detector includes at least one of the following:

a pressure sensor configured to detect an internal pressure of the tyre;

a temperature sensor configured to detect an internal temperature of the tyre;

an acceleration sensor configured to detect the rotational speed of the tyre.

Alternatively, the tyre state detector further includes:

a first storage processing device configured to store the state detection parameters of the tyre.

Alternatively, the tyre state detector further includes:

a first transmitter configured to send the state detection parameters to a monitoring device, and send the first identity identifier of the tyre state detector and the state detection parameters to the data processor in a wired or a wireless manner.

Alternatively, the data processor includes:

a low frequency exciter configured to send the low frequency excitation signal to the tyre state detector.

Alternatively, the data processor includes:

a scanner configured to scan and read bar code and/or two-dimensional code information of the tyre;

correspondingly, the second identity identifier of the tyre includes the bar code and/or two-dimensional code information of the tyre.

Alternatively, the data processor includes:

a reader configured to read RFID chip information of the tyre;

correspondingly, the second identity identifier of the tyre includes the RFID chip information of the tyre.

Alternatively, the data processor includes:

a second receiver configured to receive the first identity identifier and the state detection parameters;

a second storage processing device configured to store the first identity identifier, the second identity identifier, the usage scenario information and the present date, and determine an identity code corresponding to the tyre according to the first identity identifier and the second identity identifier, so as to establish the correspondence relation according to the identity code, the usage scenario information and the present date, and generate the tyre life cycle management information corresponding to the tyre;

a second transmitter configured to send the tyre life cycle management information to an identity code item corresponding to the tyre in a database in a wired or a wireless manner;

wherein, the identity code is a code determined according to the first identity identifier and the second identity identifier and configured to distinguish an identity of the tyre.

On the other hand, the present disclosure further provides a method for managing life cycle of tyre. The method includes:

receiving a first identity identifier of a tyre state detector and state detection parameters of a tyre that are sent by the tyre state detector;

obtaining a second identity identifier of the tyre;

receiving usage scenario information of the tyre input by a user;

establishing a correspondence relation according to the first identity identifier, the second identity identifier, the usage scenario information of the tyre, the state detection parameters of the tyre and the present date, so as to generate tyre life cycle management information corresponding to the tyre;

sending the tyre life cycle management information to an identity code item corresponding to the tyre in a database;

wherein, the identity code is a code determined according to the first identity identifier and the second identity identifier and configured to distinguish an identity of the tyre.

By receiving the first identity identifier of the tyre state detector and the state detection parameters of the tyre, and obtaining the second identity identifier and the usage scenario information of the tyre, so as to establish a correspondence relation according to the first identity identifier, the state detection parameters, the second identity identifier, the usage scenario information and the present date, and to generate and send the tyre life cycle management information corresponding to the tyre, the apparatus and method for managing life cycle of tyre of the present disclosure can achieve the life cycle management of the tyre and thus achieve the intelligent management of the tyre.

BRIEF DESCRIPTION OF THE DRAWINGS

In order to more clearly describe the technical solutions of the present embodiments or in the prior art, the drawings to be used in describing the embodiments or the prior art will be briefly described below. Obviously, the drawings in the following description are some embodiments of the present disclosure; for those of ordinary skill in the art, other drawings may also be obtained based on these drawings without any creative work.

DETAILED DESCRIPTION

In order to make the objectives, technical solutions, and advantages of the embodiments of the present disclosure clearer, the technical solutions of the embodiments of the present disclosure will be described clearly with reference to the accompanying drawings hereinafter. Obviously, the described embodiments are merely some but not all of the embodiments of the present disclosure. On the basis of the embodiments of the present disclosure, all other embodiments obtained by the person of ordinary skill in the art without creative work shall fall within the protection scope of the present disclosure.

Figure 1:
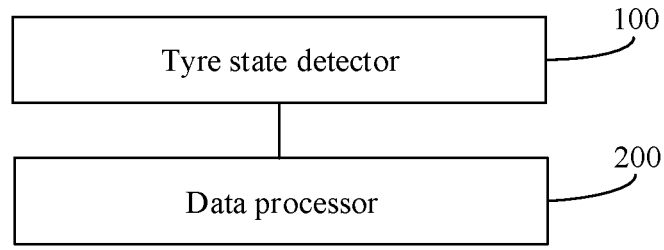
FIG. 1 is a structural diagram of the apparatus for managing life cycle of tyre according to an embodiment of the present disclosure.

FIG. 1 is a structural diagram of the apparatus for managing life cycle of tyre according to an embodiment of the present disclosure. As shown in FIG. 1, the apparatus includes a tyre state detector 100 and a data processor 200, wherein, the tyre state detector 100 is configured to detect state detection parameters of the tyre, and send a first identity identifier of the tyre state detector 100 and the state detection parameters to the data processor 200.

Wherein, the first identity identifier of the tyre state detector 100 includes identifier information configured to distinguish the tyre state detector 100 from other tyre state detectors, for example, the tyre state detector 100 has a unique ID number; the state detection parameters may include state parameters for characterizing the actual state of the tyre, such as pressure inside the tyre, temperature inside the tyre, etc.

Specifically, when receiving a low frequency excitation signal sent by the data processor 200, the tyre state detector 100 starts detecting the state detection parameters of the tyre so as to send the obtained first identity identifier of the tyre state detector 100 and the detected state detection parameters of the tyre to the data processor 200.

It can be understood that, compared with the high frequency excitation signal and the ultra high frequency excitation signal, the power consumption of the system can be reduced and the manufacturing cost of the apparatus can be saved by using the low frequency excitation signal to excite the tyre state detector 100 to detect the state detection parameters of the tyre.

In another alternative embodiment, when detecting the rotation of the wheel on which the tyre is mounted (i.e., the vehicle is running), the tyre state detector 100 can also spontaneously detect the state detection parameters of the tyre, and send the first identity identifier of the tyre state detector 100 and the detected state detection parameters of the tyre to the data processor 200, i.e., without receiving a low frequency excitation signal sent by the data processor 200.

It should be noted that the criteria that the tyre state detector 100 detects the state detection parameters of the tyre may be determined according to actual conditions, which is not limited by the present disclosure.

The data processor 200 is configured to obtain a second identity identifier of the tyre and usage scenario information of the tyre input by the user, and establish a correspondence relation according to the first identity identifier, the state detection parameters, the second identity identifier, the usage scenario information and the present date, so as to generate and send the tyre life cycle management information corresponding to the tyre.

Wherein, the usage scenario information includes the usage scenario information of the tyre input by the user and received by the data processor 200.

Specifically, the usage scenario information includes at least one of the following:

warehousing, consuming, installation, maintenance, inspection, replacement, repair, refurbishment and scrapping scenarios.

Specifically, after obtaining the first identity identifier and the state detection parameters of the tyre sent by the tyre state detector 100, the data processor 200 obtains the second identity identifier of the tyre and the usage scenario information input by the user, and performs data processing and fusion according to the first identity identifier, the state detection parameters, the second identity identifier, the usage scenario information and the present date, so as to establish the correspondence relation, generate and send the unique tyre life cycle management information corresponding to the tyre, and provide basis for the life cycle management of the tyre and the subsequent intelligent management of the tyre.

By receiving the first identity identifier of the tyre state detector 100 and the state detection parameters of the tyre, and obtaining the second identity identifier and the usage scenario information of the tyre, so as to establish a correspondence relation according to the first identity identifier, the state detection parameters, the second identity identifier, the usage scenario information and the present date, and to generate and send the tyre life cycle management information corresponding to the tyre, the apparatus for managing life cycle of tyre of the present disclosure can achieve the life cycle management of the tyre and thus achieve the intelligent management of the tyre.

Figure 2:
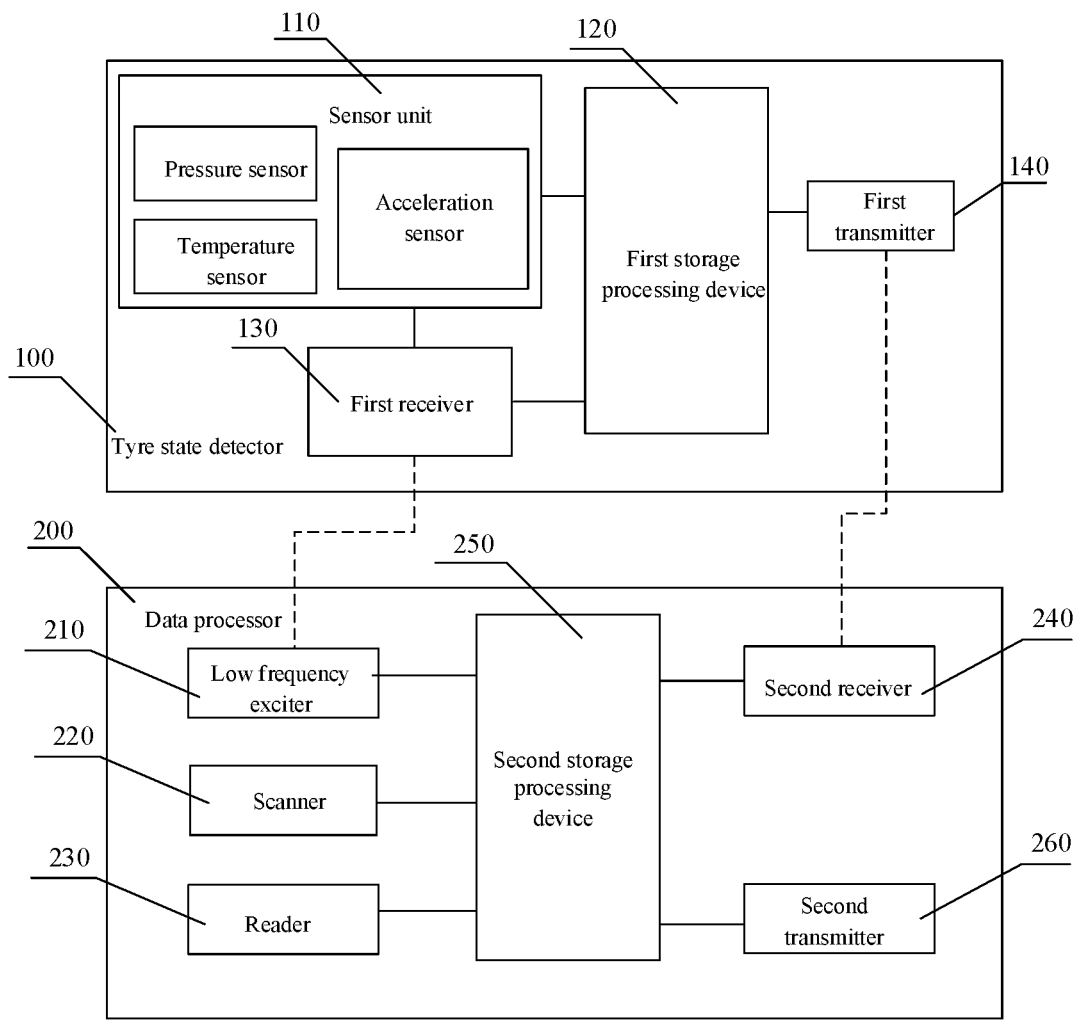
FIG. 2 is a structural diagram of the apparatus for managing life cycle of tyre according to another embodiment of the present disclosure.

FIG. 2 is a structural diagram of the apparatus for managing life cycle of tyre according to another embodiment of the present disclosure. As shown in FIG. 2, on the basis of the apparatus embodiments above, the tyre state detector 100 of the present embodiment may further include a sensor unit 110 provided inside the tyre, and the sensor unit 110 may include any one or a combination of the following:

a pressure sensor configured to detect an internal pressure of the tyre;

a temperature sensor configured to detect an internal temperature of the tyre;

an acceleration sensor configured to detect the rotational speed of the tyre.

With the pressure sensor, the temperature sensor and the acceleration sensor above, the state detection parameters of the tyre can be obtained quickly and accurately when the tyre is working (i.e., the vehicle is running), so as to lay the foundation for the subsequent life cycle management of the tyre.

In addition, in an embodiment of the present disclosure, the tyre state detector may further include:

a first storage processing device 120 configured to store and process the state detection parameters of the tyre.

Specifically, the first storage processing device 120 above is connected to the sensor unit 110 and configured to store software programs and data sent from the sensor unit 110 that are required for data processing.

In addition, in an embodiment of the present disclosure, the tyre state detector 100 may further include:

a first receiver 130 configured to receive the low frequency excitation signal;

a first transmitter 140 configured to send the state detection parameters to a monitoring device in a wired or a wireless manner, and, send the first identity identifier of the tyre state detector 100 and the state detection parameters to the data processor 200 in a wired or a wireless manner.

Specifically, the first receiver 130 above is connected to the first storage processing device 120, and capable of storing the received signals in the first storage processing device 120. The first transmitter 140 sends the state detection parameters of the tyre to a monitoring device in a wired or a wireless manner, and sends the first identity identifier of the tyre state detector 100 and the detected state detection parameters of the tyre to the data processor 200 in a wired or a wireless manner.

Wherein, the wireless sending manner includes, but is not limited to, Bluetooth, infrared, WIFI, GPRS, radio frequency, etc.

In addition, in an embodiment of the present disclosure, the data processor 200 may further include:

a low frequency exciter 210 configured to send the low frequency excitation signal to the tyre state detector 100.

Specifically, the low frequency exciter 210 sends the low frequency excitation signal to the first receiver 130 of the tyre state detector 100 according to user instructions so as to achieve the purpose of exciting the tyre state detector to detect the state parameters.

In addition, in an embodiment of the present disclosure, the data processor 200 may further include:

a scanner 220 configured to scan and read bar code and/or two-dimensional code information of the tyre.

Correspondingly, the second identity identifier of the tyre includes the bar code and/or two-dimensional code information of the tyre.

In another embodiment, the data processor 200 may further include:

a reader 230 configured to read RFID chip information of the tyre.

Correspondingly, the second identity identifier of the tyre above includes the RFID chip information of the tyre.

In addition, in an embodiment of the present disclosure, the data processor 200 may further include:

a second receiver 240 configured to receive the first identity identifier of the tyre state detector and the state detection parameters of the tyre;

a second storage processing device 250 configured to store the first identity identifier, the second identity identifier, the usage scenario information and the present date, and determine the identity code corresponding to the tyre according to the first identity identifier and the second identity identifier, so as to establish the correspondence relation according to the identity code, the usage scenario information and the present date, and generate the tyre life cycle management information corresponding to the tyre;

a second transmitter 260 configured to send the tyre life cycle management information to an identity code item corresponding to the tyre in a database in a wired or a wireless manner.

Wherein, the identity code is a code determined according to the first identity identifier and the second identity identifier and configured to distinguish the identity of the tyre.

It can be understood that, the data processor 200 of the present embodiment can also transmit the combined code to a monitoring device, a corollary equipment and so on according to actual needs.

It should be noted that, the content included in the second identity identifier of the tyre of the present embodiment may be selected according to actual conditions. For example, the bar code and/or two-dimensional code information of the tyre may be used as the second identity identifier; or, the RFID chip information may be used as the second identity identifier; or, the bar code and/or two-dimensional code information of the tyre and the RFID chip information may be used together as the second identity identifier.

For example, when the second identity identifier includes the bar code and/or two-dimensional code information of the tyre, the data processor 200 scans the bar code and/or two-dimensional code of the tyre through the scanner 220 and stores the read bar code and/or two-dimensional code information in the second storage processing device 250, so as to automatically combine the stored ID number of the tyre state detector 100 and the bar code or the two-dimensional code into a set of codes as the identity code corresponding to the tyre by the second storage processing device 250, and transmit the identity code to the identity code item corresponding to the tyre in the database in a wired or a wireless manner by the second transmitter 260.

In addition, in an embodiment of the present disclosure, the apparatus may further include a battery pack for powering the data processor 200.

In addition, in an embodiment of the present disclosure, the apparatus may further include a display device configured to display state parameters of each tyre of the vehicle (temperature, pressure, etc. inside the tyre), the number of the tyres and alarm information of abnormal conditions.

Figure 3:
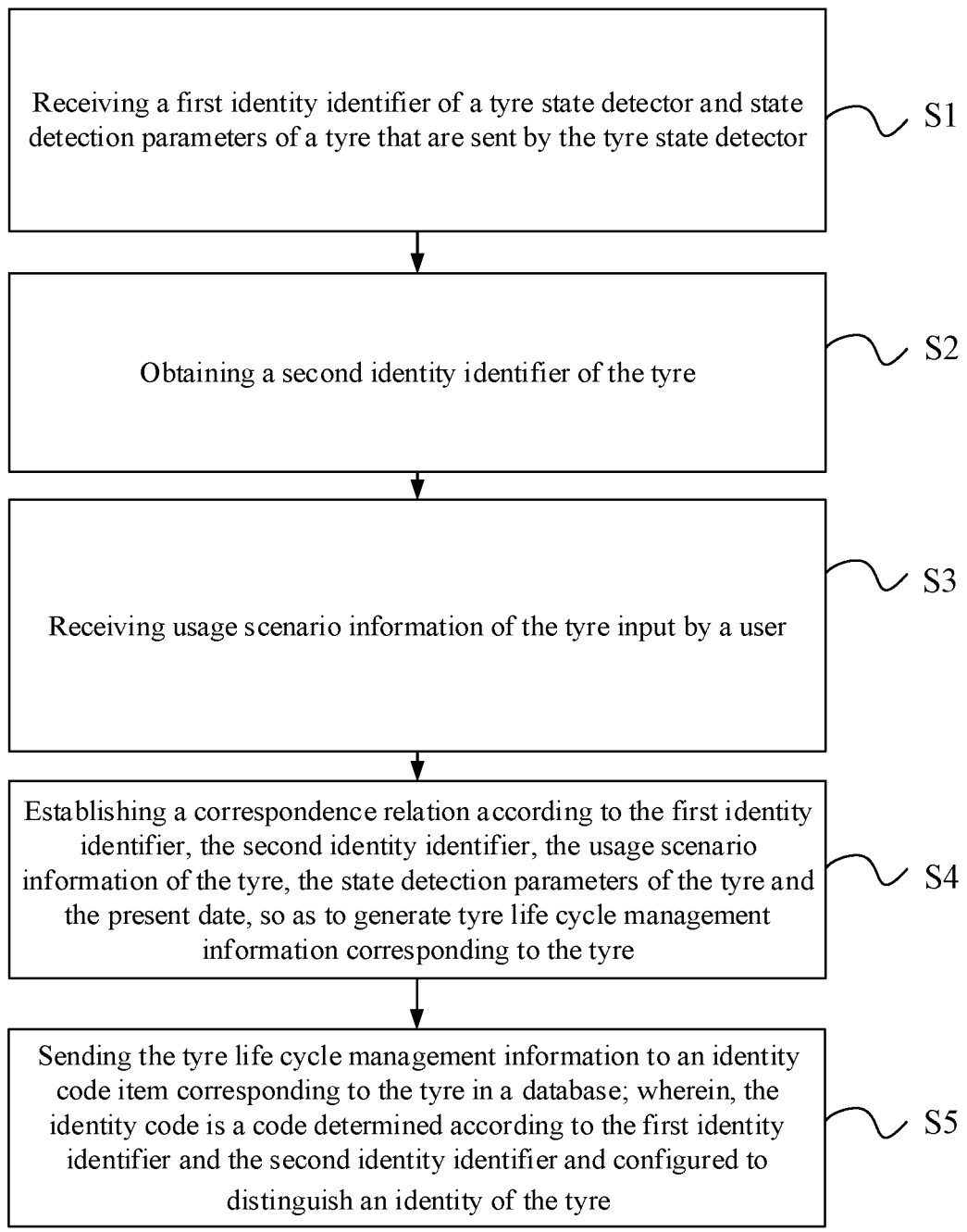
FIG. 3 is a flow chart of the method for managing life cycle of tyre according to an embodiment of the present disclosure.

FIG. 3 is a flow chart of the method for managing life cycle of tyre according to an embodiment of the present disclosure. As shown in FIG. 3, the method includes:

S1: receiving a first identity identifier of a tyre state detector and state detection parameters of a tyre that are sent by the tyre state detector;

S2: obtaining a second identity identifier of the tyre;

S3: receiving usage scenario information of the tyre input by a user;

S4: establishing a correspondence relation according to the first identity identifier, the second identity identifier, the usage scenario information of the tyre, the state detection parameters of the tyre and the present date, so as to generate tyre life cycle management information corresponding to the tyre;

S5: sending the tyre life cycle management information to an identity code item corresponding to the tyre in a database;

wherein, the identity code is a code determined according to the first identity identifier and the second identity identifier and configured to distinguish the identity of the tyre.

In addition, in an embodiment of the present disclosure, the usage scenario information includes at least one of the following:

warehousing, consuming, installation, maintenance, inspection, replacement, repair, refurbishment and scrapping scenarios.

It should be noted that, the method for managing life cycle of tyre of the present embodiment can be implemented based on the apparatus embodiments above. Since the method is similar to the working processes of the apparatus embodiments, the description is relatively simple, and the relevant parts can be referred to the description of the apparatus embodiments.

The apparatus and method for managing life cycle of tyre of the present disclosure are described hereinafter with a specific embodiment, which does not limit the protection scope of the present disclosure. A method of using the apparatus for managing life cycle of tyre of the present embodiment includes:

Mounting an un-enabled tyre state detector with an independent ID number on a target tyre, and activating the tyre state detector with a low frequency excitation signal sent by the data processor. The activated tyre state detector automatically operates to issue the ID number and a specific coded program, and the data processor has a specific coded program connected to the coded program of the tyre state detector. Then, the data processor receives the ID number and store it in the second storage processing device, and the data processor or the scanner scans the bar code and/or two-dimensional code; or, the reader reads the RFID chip code of the tyre, so as to input the read two-dimensional code or bar code or RFID chip code to the second storage processing device which automatically combines the two sets of codes into one set of code and transmits the new code to the database in a wired or wireless manner, so as to replace the original code in the database as the new identity code of the tyre. All information under the original code item is classified into the new code item, and the user is reminded to trigger the usage scenario (such as warehousing, consuming, installation, maintenance, inspection, replacement, repair, refurbishment, scrapping, etc.) button arranged on the data processor according to actual usage scenario. The actual usage scenario information and the ID number of the tyre state detector mounted on the tyre are input to the second storage processing device, and the second storage processing device classifies the usage scenario information and the date into the ID number of the tyre, and transmits the usage scenario information and the date to the identity code item of the tyre of the database and/or the monitoring device in a wired or a wireless manner, so as to accomplish the full process recording, traceability, and full process management of various tyre life cycle usage scenarios in the database and/or monitoring device.

By detecting the state detection parameters of the tyre after receiving the low frequency excitation signal, and sending the first identity identifier of the tyre state detector and the detected state detection parameters of the tyre to the data processor, so that the data processor performs data processing according to the first identity identifier, the state detection parameters, the second identity identifier, the usage scenario information and the present date, so as to obtain the tyre life cycle management information and send the tyre life cycle management information to the identity code item corresponding to the tyre in the database, the apparatus for managing life cycle of tyre of the present disclosure can achieve the life cycle management of the tyre, and thus the intelligent management of the tyre is achieved, which is of great significance to the new product development, product improvement, business model innovation and product promotion of the tyre manufacturers.

The embodiments above are only used to illustrate rather than to limit the technical solutions of the present disclosure; although the present disclosure has been described in detail with reference to the foregoing embodiments, those of ordinary skills in the art should understand that they can still modify the technical solutions described in the foregoing embodiments, or equivalently replace some of the technical features therein; and these modifications or replacements do not separate the essence of the corresponding technical solutions from the spirit and scope of the technical solutions of each of the embodiments of the present disclosure.

What is claimed is:

1. An apparatus for managing life cycle of tyre, comprises a tyre state detector and a data processor;

wherein, the tyre state detector is configured to detect state detection parameters of a tyre, and send a first identity identifier of the tyre state detector and the state detection parameters to the data processor; and the data processor is configured to obtain a second identity identifier of the tyre and usage scenario information of the tyre input by a user, and establish a correspondence relation according to the first identity identifier, the state detection parameters, the second identity identifier, the usage scenario information and present date, so as to generate and send tyre life cycle management information corresponding to the tyre, wherein, the tyre state detector comprises at least one of the following:

a pressure sensor configured to detect an internal pressure of the tyre;

a temperature sensor configured to detect an internal temperature of the tyre; and an acceleration sensor configured to detect a rotational speed of the tyre.

2. The apparatus of claim 1, wherein, the data processor comprises a low frequency exciter configured to send a low frequency excitation signal to the tyre state detector;

the tyre state detector further comprises a first receiver configured to receive the low frequency excitation signal;

correspondingly, the tyre state detector is specifically configured to detect the state detection parameters of the tyre after receiving the low frequency excitation signal sent by the data processor.

3. The apparatus of claim 1, wherein, the tyre state detector is specifically configured to detect the state detection parameters of the tyre after detecting a rotation of a wheel corresponding to the tyre.

4. The apparatus of claim 1, wherein, the tyre state detector further comprises:

a first storage processing device configured to store the state detection parameters of the tyre.

5. The apparatus of claim 1, wherein, the tyre state detector further comprises:

a first transmitter configured to send the state detection parameters to a monitoring device, and send the first identity identifier of the tyre state detector and the state detection parameters to the data processor in a wired or a wireless manner.

6. The apparatus of claim 1, wherein, the data processor comprises:

a scanner configured to scan and read bar code and/or two-dimensional code information of the tyre;

correspondingly, the second identity identifier of the tyre comprises the bar code and/or two-dimensional code information of the tyre.

7. The apparatus of claim 1, wherein, the data processor comprises:

a reader configured to read RFID chip information of the tyre;

correspondingly, the second identity identifier of the tyre comprises the RFID chip information of the tyre.

8. The apparatus of claim 6, wherein, the data processor further comprises:

a second receiver configured to receive the first identity identifier and the state detection parameters;

a second storage processing device configured to store the first identity identifier, the second identity identifier, the usage scenario information and the present date, and determine an identity code corresponding to the tyre according to the first identity identifier and the second identity identifier, so as to establish the correspondence relation according to the identity code, the usage scenario information and the present date, and generate the tyre life cycle management information corresponding to the tyre;

a second transmitter configured to send the tyre life cycle management information to an identity code item corresponding to the tyre in a database in a wired or a wireless manner;

wherein, the identity code is a code determined according to the first identity identifier and the second identity identifier and configured to distinguish an identity of the tyre.

9. A method for managing life cycle of tyre, comprises:

receiving a first identity identifier of a tyre state detector and state detection parameters of a tyre that are sent by the tyre state detector;

obtaining a second identity identifier of the tyre;

receiving usage scenario information of the tyre input by a user;

establishing a correspondence relation according to the first identity identifier, the second identity identifier, the usage scenario information of the tyre, the state detection parameters of the tyre and the present date, so as to generate tyre life cycle management information corresponding to the tyre;

sending the tyre life cycle management information to an identity code item corresponding to the tyre in a database;

wherein, the identity code is a code determined according to the first identity identifier and the second identity identifier and configured to distinguish an identity of the tyre, and the state detection parameters of the tyre comprise at least one of an internal pressure of the tyre, an internal temperature of the tyre, and a rotational speed of the tyre.

* * * * *